Sept. 13, 1932. S. C. BOOTH 1,877,264
ANIMAL TRAP
Filed June 12, 1928

INVENTOR
SAMUEL C. BOOTH
BY Featherstonhaugh & Co
ATTORNEYS

Patented Sept. 13, 1932

1,877,264

UNITED STATES PATENT OFFICE

SAMUEL C. BOOTH, OF MONTREAL, QUEBEC, CANADA

ANIMAL TRAP

Application filed June 12, 1928. Serial No. 284,760.

This invention relates to new and useful improvements in animal traps and particularly to that type of trap in which a pair of jaws hingedly connected to a frame or back piece are adapted, when set, to be released by the depression of a plate or platform, also hinged to the frame, so as to lie between the jaws, said jaws being adapted, when released, to close under the action of a spring.

The main object of the invention is to provide a trap which will take the animal alive and unhurt and without injuring the fur.

Another object of the invention is to provide a trap of inexpensive construction, which will be strong and durable, and which will be capable of application to a wide range of service.

A further object is to provide a trap which may be quickly and easily set and which will not be dangerous to the trapper himself.

A still further object is to provide an animal trap which will be easily kept in good condition.

According to my invention, I provide a trap the general construction of which is similar to the traps at present in use, that is, it is provided with a base, to which are pivotally secured a pair of jaws which are closed under the action of a spring. The jaws are locked in the open position by means of a bar pivotally attached to the base and adapted to overlie one of the jaws and engage with a projection formed in a plate positioned centrally of the trap and pivotally secured to the base. The jaws are released by depressing the plate so that it will become disengaged from the locking bar.

My improvement lies in the formation of the adjacent edges of the jaws and in providing means for taking the shock of the closing of the trap partially on to the spring instead of taking the full shock of closing on the animal's leg or legs as is the case in traps at present in use.

In the drawing which illustrates my invention:

Figure 1:
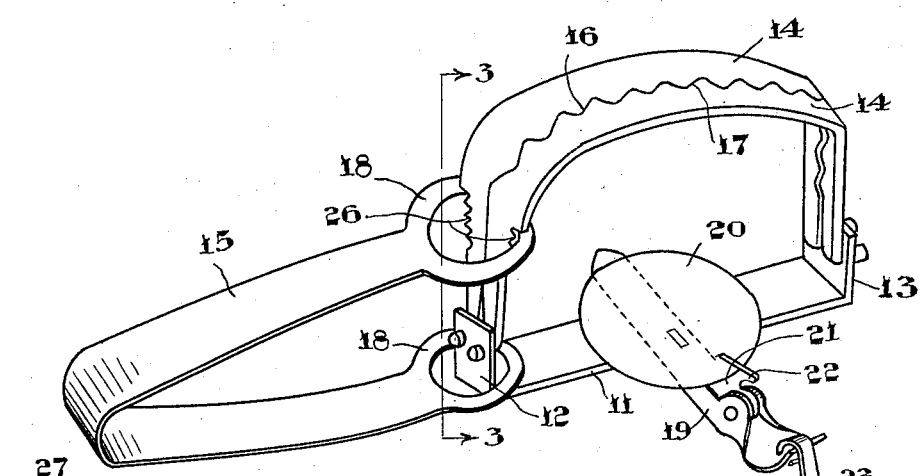
Figure 1 is a perspective view of my improved trap in the closed position.
Figure 3:
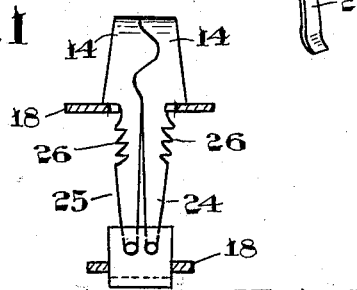
Figure 3 is a sectional end elevation of the trap taken on the line 3—3 Figure 1.
Figure 2:
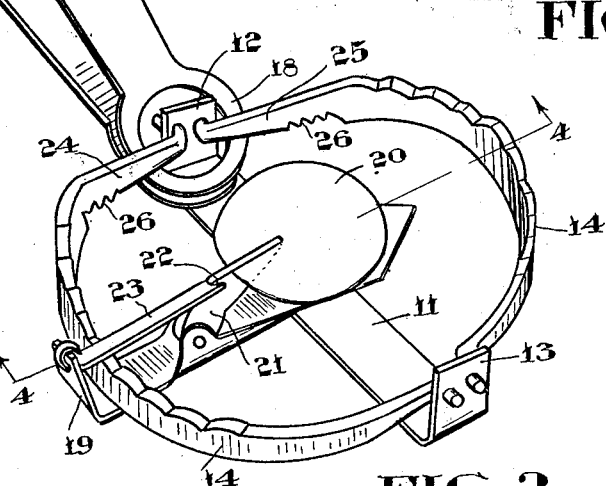
Figure 2 is a perspective view of the trap shown in Figure 1, but in the open or set position.
Figure 4:
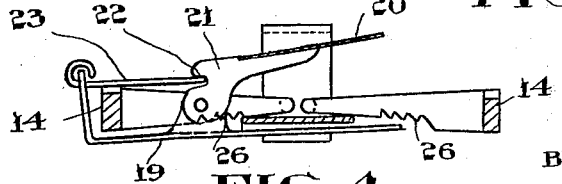
Figure 4 is a sectional end elevation of the trap taken on the line 4—4 Figure 2.

Referring more particularly to the drawing, 11 designates the base plate which is turned upwardly at the ends 12 and 13. Pivotally secured to the upwardly turned ends are the trap jaws 14, which are adapted to be brought together by the action of a spring 15. The adjacent edges 16 and 17 of the jaws are provided with rounded teeth or serrations so that when closed the serrations will fit into one another as shown clearly in Figure 1. At one end, the jaws are adapted to be encircled by the eye 18 of the spring 15 which is of the usual U type, adapted to expand to close the trap by pressing against the jaw ends. Extending outwardly from one side of the base or frame is the bracket 19 and pivotally secured to said bracket is the lever 21 which supports the plate 20. The lever has a recess 22 formed therein adapted to engage with the free end of a locking bar 23 pivotally secured to the end of the bracket 19.

The bar when in use overlies one of the jaws and engages with the locking recess in the plate lever. When the plate is depressed the bar becomes disengaged from the recess and allows the spring to force the jaws together. The ends of the jaws adjacent the spring are tapered and formed in the edges 24 and 25 of the jaws, remote from one another, are the serrations or teeth 26. When the trap is sprung with nothing between the jaws, the spring clears the teeth 26 and the jaws close together. If, however, there is any obstacle between the jaws, such as an animal's leg, then the eye of the spring engages the teeth or serrations 26, so that the shock of the spring is partially absorbed and this tends to prevent breaking of the animal's leg. In this manner, the animal's leg is prevented from receiving the full force of the jaws when acted upon by the spring and if there is any pulling or struggling to release the leg, the eye of the spring will adjust itself in the notches and saw teeth of the tapered jaws to firmly hold the animal but without undue injury to the fur, flesh or bone.

The trap is set and operated in the usual manner. When an animal is caught for instance, by the leg, the spring partially closes the jaws, but when the eye of the spring comes in contact with the teeth 26, the initial shock is absorbed but the pressure is still sufficient to firmly hold the leg between the jaws. If the animal struggles to remove its foot, by pulling on the anchor chain 27, there may be a slight amount of give to the jaws, but the spring working over the teeth 26 will quickly adjust itself to maintain a sufficient holding pressure. Many animals of various sizes have been caught in my trap without injury and this is a great advantage especially when it is desired to keep them for breeding purposes.

Having thus described my invention, what I claim is:—

A pivoted jaw trap comprising a pair of pivotally mounted jaws, a jaw closing spring having an eye receiving corresponding ends of the jaws therethrough and a series of pressure relieving notches formed in the eye engaging edges of the jaws, each pressure relieving notch being formed with a major wall portion sloping inwardly and upwardly from the eye engaging edge of the jaw and with a minor wall portion sloping upwardly and outwardly from the upper end of the major wall portion to the upper end of the notch, the relative length and inclination of said major and minor wall portions being such that the spring pressure is relieved during the entire period that the spring eye is ascending the major wall portion of the notch and is increased only to a limited extent by engagement of the eye with the minor wall portion before said eye is permitted to pass into the next upper notch.

In witness whereof, I have hereunto set my hand.

SAMUEL C. BOOTH.